United States Patent
Lian et al.

(10) Patent No.: US 7,873,913 B2
(45) Date of Patent: Jan. 18, 2011

(54) CONTENT SCROLLING SYSTEM AND METHOD

(75) Inventors: Wen-Chuan Lian, Shenzhen (CN); Hua-Dong Cheng, Shenzhen (CN); Jiang-Yong Zhou, Shenzhen (CN)

(73) Assignees: Ensky Technology (Shenzhen) Co., Ltd., Baoan District, Shenzhen, Guangdong Province; Ensky Technology Co., Ltd., Pan Chiao, Taipei Hsien (TW)

( * ) Notice: Subject to any disclaimer, the term of this patent is extended or adjusted under 35 U.S.C. 154(b) by 828 days.

(21) Appl. No.: 11/752,921

(22) Filed: May 23, 2007

(65) Prior Publication Data

US 2008/0155463 A1 Jun. 26, 2008

(30) Foreign Application Priority Data

May 24, 2006 (CN) .................. 2006 1 0060767

(51) Int. Cl.
*G06F 3/048* (2006.01)
*G06F 3/00* (2006.01)

(52) U.S. Cl. .................. 715/786; 715/784; 715/785; 715/787; 345/156; 345/159

(58) Field of Classification Search ......... 345/156–159; 715/784, 785, 786, 787
See application file for complete search history.

(56) References Cited

U.S. PATENT DOCUMENTS

| | | | | |
|---|---|---|---|---|
| 4,786,895 A * | 11/1988 | Castaneda | ............... | 345/160 |
| 5,371,846 A * | 12/1994 | Bates | .................. | 715/786 |
| 5,434,591 A * | 7/1995 | Goto et al. | ............... | 345/688 |
| 5,682,488 A * | 10/1997 | Gleason et al. | ............. | 715/833 |
| 5,757,370 A | 5/1998 | Amro | | |
| 5,850,211 A * | 12/1998 | Tognazzini | ................ | 345/158 |
| 5,872,566 A * | 2/1999 | Bates et al. | ................ | 715/786 |
| 5,877,748 A * | 3/1999 | Redlich | ..................... | 345/163 |
| 5,889,236 A * | 3/1999 | Gillespie et al. | .......... | 178/18.01 |
| 5,966,125 A * | 10/1999 | Johnson | .................... | 715/835 |
| 6,067,069 A * | 5/2000 | Krause | ..................... | 345/685 |
| 6,157,381 A * | 12/2000 | Bates et al. | ................ | 715/786 |
| 6,208,343 B1 * | 3/2001 | Roth | ........................ | 715/786 |
| 6,252,594 B1 | 6/2001 | Xia | | |
| 6,259,432 B1 * | 7/2001 | Yamada et al. | ............. | 345/159 |
| 6,337,694 B1 * | 1/2002 | Becker et al. | .............. | 345/684 |
| 6,714,221 B1 * | 3/2004 | Christie et al. | ............. | 715/784 |
| 6,856,326 B1 * | 2/2005 | Zhai | ........................ | 345/684 |
| 6,874,126 B1 * | 3/2005 | Lapidous | .................... | 715/711 |
| 6,922,816 B1 * | 7/2005 | Amin et al. | ................. | 715/833 |
| 7,173,637 B1 * | 2/2007 | Hinckley et al. | ........... | 345/684 |
| 7,493,321 B2 * | 2/2009 | Bartek et al. | ...................... | 1/1 |
| 7,605,827 B2 * | 10/2009 | Sugahara | .................... | 345/684 |
| 7,714,840 B2 * | 5/2010 | Hinckley et al. | ............ | 345/163 |
| 2002/0109728 A1 * | 8/2002 | Tiongson et al. | ............ | 345/786 |
| 2002/0118169 A1 * | 8/2002 | Hinckley et al. | ............ | 345/163 |

(Continued)

*Primary Examiner*—Steven B Theriault
(74) *Attorney, Agent, or Firm*—Winston Hsu; Scott Margo

(57) ABSTRACT

An exemplary content scrolling system includes a display unit for displaying content, a scroll bar for scrolling the displayed content, and a processing unit for scrolling the displayed content based on a scroll input of the scroll bar. The processing unit includes a scroll amount calculating module and a content scrolling module. The scroll amount calculating module is for calculating for calculating a scroll amount mapping to the scroll input according to a particular formula. The content scrolling module is for scrolling the displayed content according to the scroll amount. Related exemplary content scrolling methods are also provided.

7 Claims, 7 Drawing Sheets

U.S. PATENT DOCUMENTS

| | | |
|---|---|---|
| 2003/0043174 A1 | 3/2003 | Hinckley et al. |
| 2003/0076301 A1* | 4/2003 | Tsuk et al. ............... 345/159 |
| 2004/0189600 A1* | 9/2004 | Hinckley et al. ......... 345/156 |
| 2006/0248470 A1* | 11/2006 | Lee et al. ............... 715/784 |
| 2007/0143706 A1* | 6/2007 | Peters ................... 715/786 |

* cited by examiner

CONTENT SCROLLING SYSTEM AND METHOD

1. TECHNICAL FIELD

The present invention relates to content scrolling systems and methods, and particularly to a content scrolling system and method that achieve scrolling according to a scroll input of a scroll bar.

2. GENERAL BACKGROUND

One of the most common uses of a computer system is to display electronic documents. Contemporary computer systems and programs provide flexibility in viewing a document, including jumping to hyperlinked locations in the document, zooming in and out of displayed content, allowing a user to jump to a desired page by indicating a desired page number, and so on. Furthermore, when the document contains more content than can be displayed in a viewing area, the computer systems and programs further provide scroll bars and scrolling methods to navigate through the document.

Conventional scroll bars are used for scrolling to portions of documents not shown in the viewing area. In a conventional scrolling method, in response to an instruction to perform a scroll operation, a linear content scrolling displacement process (such as that shown in FIG. 1) is applied. Thereby, a user can scroll through the content of the document. That is, in the conventional scrolling method, a scroll amount "$a_i$" is directly proportional to a scroll input unit "k". The scroll amount "$a_i$" is also related to a total size of the document. When the total size of the document is small, the scroll amount "$a_i$" is assigned with a small value; otherwise, the scroll amount "$a_i$" is assigned with a large value. For a small document, the resulting movement (namely scroll amounts) may appear to be slow; whereas, for a large document, it may be appear to be fast. Consequently, many users find that precision scrolling is difficult with this kind of linear scrolling control.

What is needed, therefore, is a fast and effective content scrolling system and method for quickly obtaining the specific portion or content of interest to the user.

SUMMARY

A content scrolling system capable of quickly and efficiently displaying desired content of a document is provided. The system includes a display unit, a scroll bar, and a processing unit. The display unit is configured for displaying content of an electronic document. In an exemplary embodiment, the scroll bar is configured for receiving a user instruction to scroll the displayed content forward or backward. The processing unit includes a scroll input calculating module, a scroll amount calculating module, and a content scrolling module.

The scroll input calculating module is configured for calculating a scroll input "y" of the scroll bar in response to a scroll operation. The scroll amount calculating module is configured for calculating a scroll amount "p" mapping to the scroll length "y" according to a formula which can be selected from the group consisting of the formula:

$$p = \left[\sum_{i=0}^{m} a_i\right],$$

wherein m is derived from the ceil function ceil(y/k), x is derived from the mod function mod(y/k), $a_i$ is derived from the function:

$$a_i = f(i) = \begin{cases} 0 & \text{if } i = 0 \\ g(i) & \text{if } i \neq 0, \end{cases} \text{ wherein } g(i) \text{ is an increasing function;}$$

and i is an integer that is less than or equal to m. The content scrolling module is configured for scrolling the displayed content according to the scroll amount "p".

Another content scrolling system capable of quickly and efficiently obtaining desired content of a document is also provided. The system includes a display unit, a scroll bar, and a processing unit. The display unit is configured for displaying content of an electronic document. The scroll bar is configured for receiving a user instruction to scroll the displayed content forward or backward. The processing unit includes a scroll input calculating module, a scroll amount calculating module, and a content scrolling module.

The scroll input calculating module is configured for calculating a scroll input "y" of the scroll bar in response to a scroll operation. The scroll amount calculating module is configured for calculating a scroll amount "p" mapping to the scroll length "y" according to a formula selected from the group consisting of the formula:

$$p = \left[\sum_{i=0}^{m} a_i\right] + [\text{ceil}(x/k * a_{m+1})],$$

and the formula:

$$p = \left[\sum_{i=0}^{m} a_i\right] + [\text{floor}(x/k * a_{m+1})],$$

wherein m is derived from the floor function floor(y/k), x is derived from the mod function mod(y/k), $a_i$ is derived from the function:

$$a_i = f(i) = \begin{cases} 0 & \text{if } i = 0 \\ g(i) & \text{if } i \neq 0, \end{cases} \text{ wherein } g(i) \text{ is an increasing function;}$$

and i is an integer that is less than or equal to m. The content scrolling module is configured for scrolling the displayed content according to the scroll amount "p".

A content scrolling method for controlling scrolling of displayed content of an electronic document is also provided. The method includes the steps of: (a) defining a scroll length "k" as a scroll input unit; (b) calculating a scroll input "y" of a scroll bar in response to a scroll operation thereon; (c) calculating a scroll amount "p" mapping to the scroll input "y" of the scroll bar according to a formula selected from the group consisting of the formula:

$$p = \left[\sum_{i=0}^{m} a_i\right] + [\text{ceil}(x/k * a_{m+1})],$$

and the formula:

$$p = \left[\sum_{i=0}^{m} a_i\right] + [\mathrm{floor}(x/k * a_{m+1})],$$

wherein m is derived from the floor function floor(y/k), x is derived from the mod function mod(y/k), $a_i$ is derived from the function:

$$a_i = f(i) = \begin{cases} 0 & \text{if } i = 0 \\ g(i) & \text{if } i \neq 0, \text{ wherein } g(i) \text{ is an increasing function;} \end{cases}$$

and i is an integer that is less than or equal to m; and (d) scrolling the displayed content according to the scroll amount "p".

Other novel features and advantages will be drawn from the following detailed description with reference to the attached drawings, in which:

DETAILED DESCRIPTION OF EMBODIMENTS

Referring to FIGS. 2, 4, 5, and 7, these show aspects of a content scrolling system in accordance with a preferred embodiment of the present invention. The content scrolling system is capable of scrolling an exact increment of a displayed document in a viewing area and quickly providing a display of specific desired portions of the document. The term "document" is used broadly herein to refer to electronic files of all types including, but not limited to, text-based files, audio files, video files, image files, etc.

Figure 1:
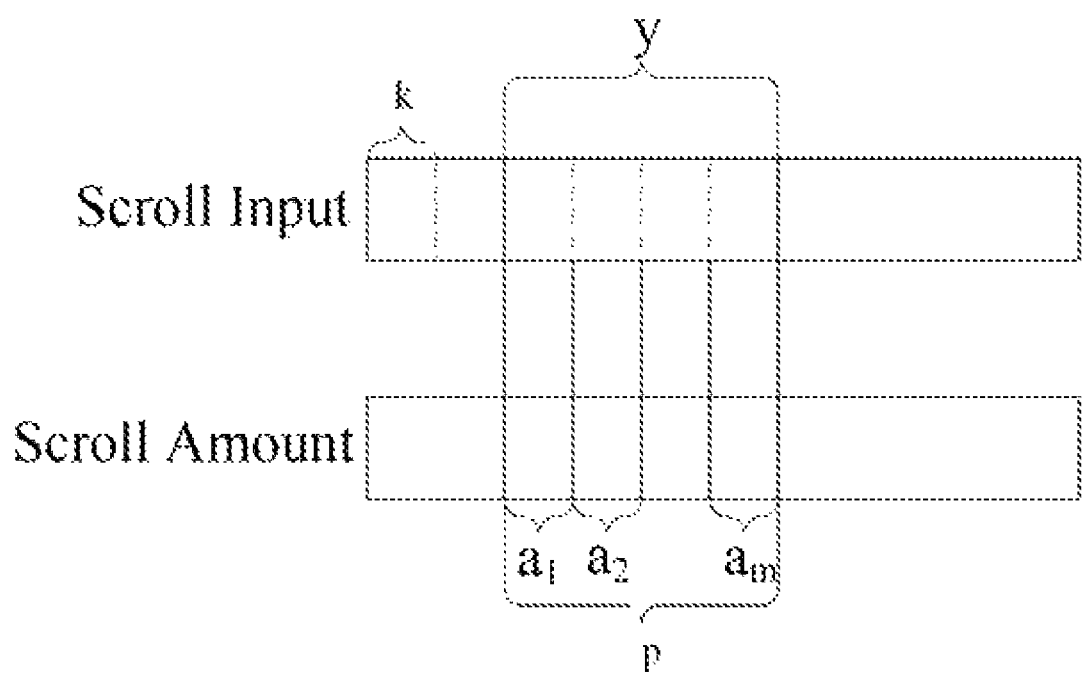
FIG. 1 is a schematic diagram showing a conventional relationship between a scroll input "y" of a scroll bar and scroll amount "p", which relationship governs movement of content of a document shown on a display unit of a computer system.

The content scrolling system defines "k" as a scroll input unit and "$a_i$" as a scroll amount that is directly proportional to the scroll input unit "k". In addition, the content scrolling system includes certain conventional content scrolling technologies, which may include, but are not limited to, the technologies described above in relation to the discussion of the general background. Advantageously, in the present embodiment, the content scrolling system assigns "$a_i$" with a value non-linearly proportional to "k", such as the value "$a_i$" shown in FIG. 4 or the value "$a_i$" shown in FIG. 7. This contrasts with conventional content scrolling technologies, in which "$a_i$" is assigned a value linearly proportional to "k", such as the value "$a_i$" shown in FIG. 1. Thereby, the content scrolling system obtains a non-linear scroll amount "p" mapping to a scroll input "y" (see below) based on the scroll amount "$a_i$".

The content scrolling system 10 mainly includes a scroll bar 12, a display unit 13, and a processing unit 11. The display unit 13 is configured for displaying the content of a document. The scroll bar 12 is configured for receiving a user instruction to scroll the displayed content forward or backward, or up or down, or left or right, as the case may be. In the following description, for the sake of simplicity and unless the context indicates otherwise, it will be assumed that the user instruction is for the displayed content to be scrolled forward or backward. The processing unit 11 includes a scroll input calculating module 111, a scroll amount calculating module 112, and a content scrolling module 113.

The scroll input calculating module 111 is configured for calculating a scroll input "y" of the scroll bar 12 in response to a user operation on the scroll bar. The scroll input "y" may be greater than or equal to the scroll input unit "k" (such as the scroll input "y" shown in FIGS. 4, 7), or may be less than the scroll input unit "k" (such as the scroll input "y" shown in FIG. 5).

The scroll amount calculating module 112 is configured for calculating the scroll amount "p" mapping to the scroll input "y" of the scroll bar 12.

In a preferred embodiment, the scroll amount calculating module 112 calculates the scroll amount "p" according to the following formula 1:

$$p = \left[\sum_{i=0}^{m} a_i\right] + [\mathrm{ceil}(x/k * a_{m+1})], \quad \text{formula 1}$$

wherein m is derived from a floor function floor(y/k), x is derived from a mod function mod(y/k), $a_i$ is derived from the following function:

$$a_i = f(i) = \begin{cases} 0 & \text{if } i = 0 \\ g(i) & \text{if } i \neq 0 \text{ wherein } g(i) \text{ is an increaseing function} \\ & \text{which can be an arithmetic progression increasing function} \\ & \text{or a geometric progression increasing function} \end{cases}$$

and i is an integer that is less than or equal to m. Typically, when m is "0", that is, when y is less than k, formula 1 is reduced to:

$$p = (\mathrm{ceil}(x/k * a_i)).$$

In addition, in another typical case, the ceil function ceil(x/k*$a_{m+1}$) in formula 1 may be replaced by a floor function floor(x/k*$a_{m+1}$).

In another preferred embodiment, the scroll amount calculating module 112 calculates the scroll amount "p" according to the following formula 2:

$$p = \left[\sum_{i=0}^{m} a_i\right], \quad \text{formula 2}$$

wherein m is derived from a ceil function ceil(y/k), $a_i$ is derived from the function same as that described above in relation to formula 1, and i is an integer which is less than or equal to m.

The content scrolling module 113 is configured for scrolling the displayed content forward or backward according to the scroll amount "p". Thus the content of a displayed document is scrolled to a desired location in a viewing area of the display unit 13.

Figure 2:
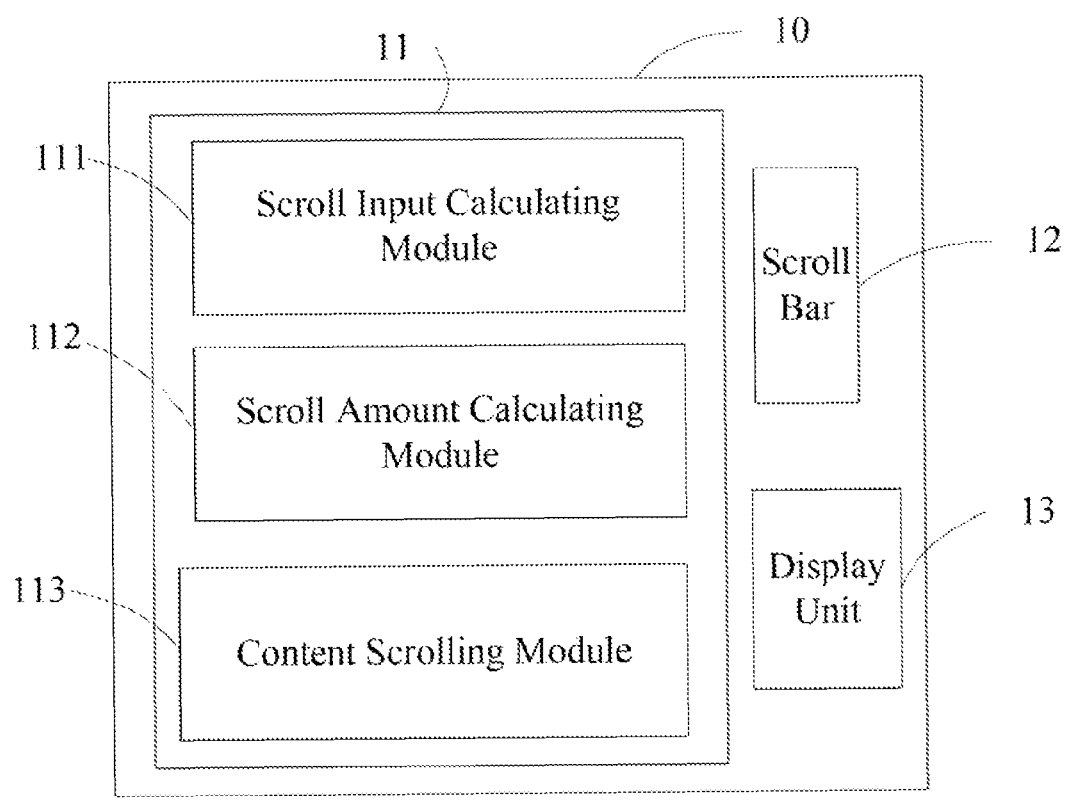
FIG. 2 is a schematic diagram of hardware infrastructure of a content scrolling system in accordance with a preferred embodiment of the present invention.
Figure 3:
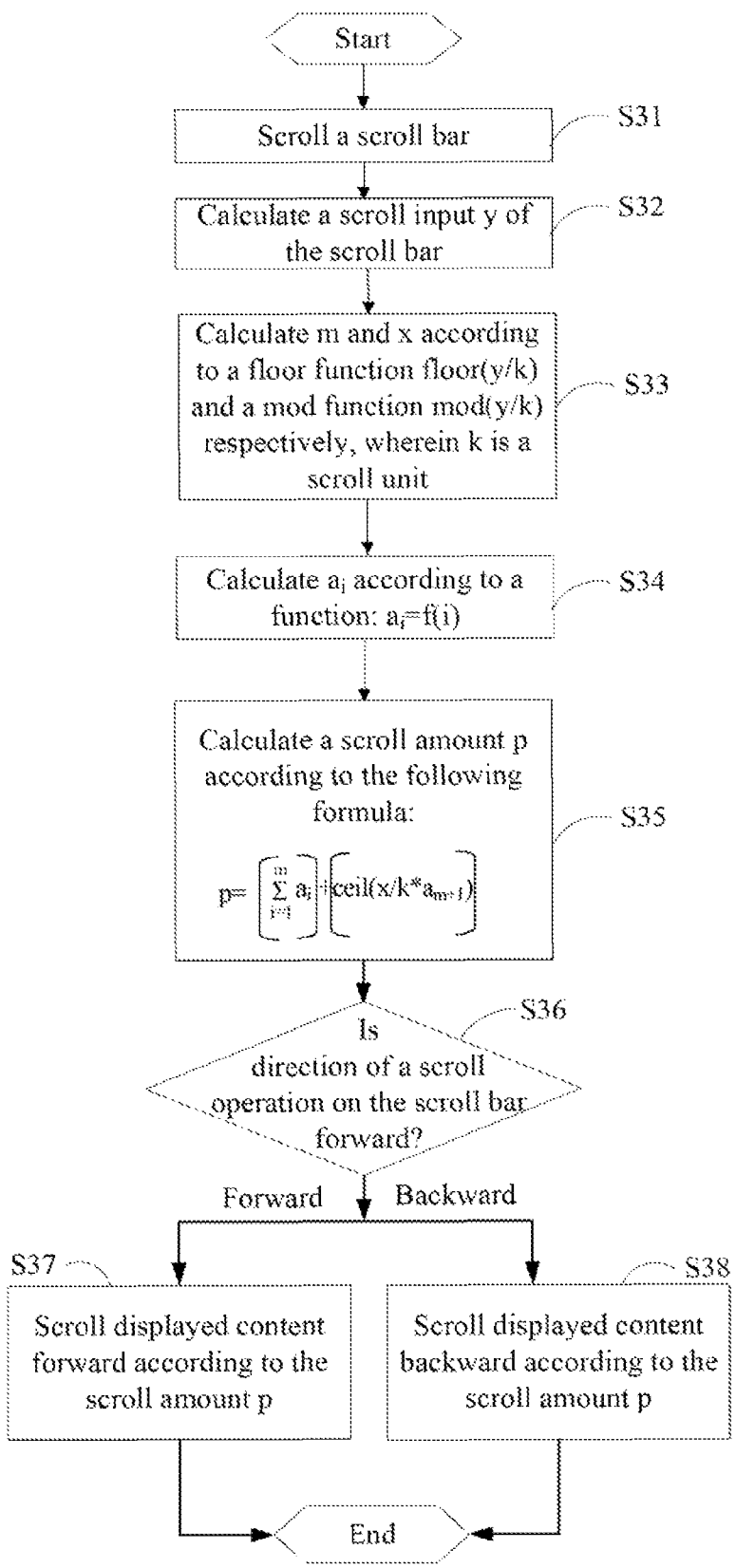
FIG. 3 is a flowchart of a first preferred content scrolling method, which is performed by utilizing the system of FIG. 2.
Figure 4:
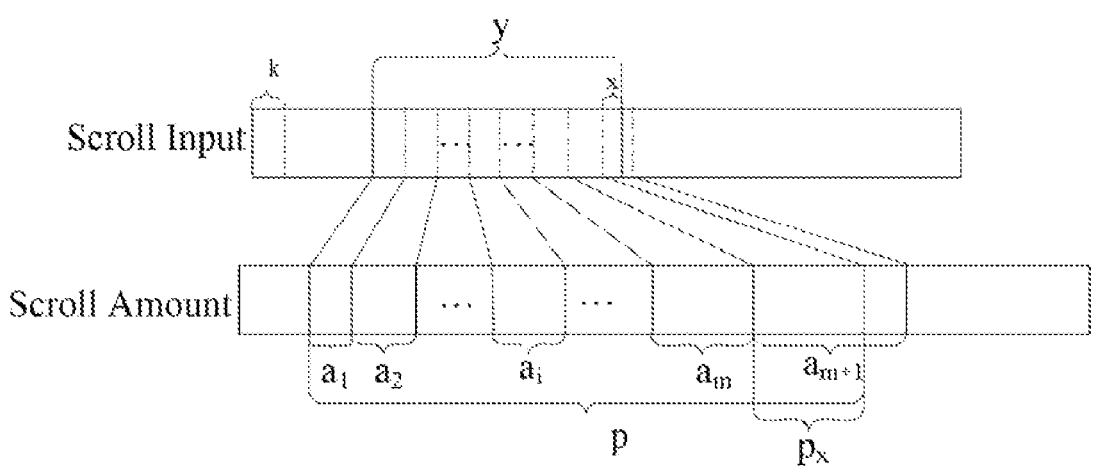
FIG. 4 is a schematic diagram illustrating a first exemplary relationship between a scroll input "y" of a scroll bar and a scroll amount "p", which relationship governs movement of content of a document shown on a display unit of the system of FIG. 2 when the method of FIG. 3 is performed.
Figure 5:
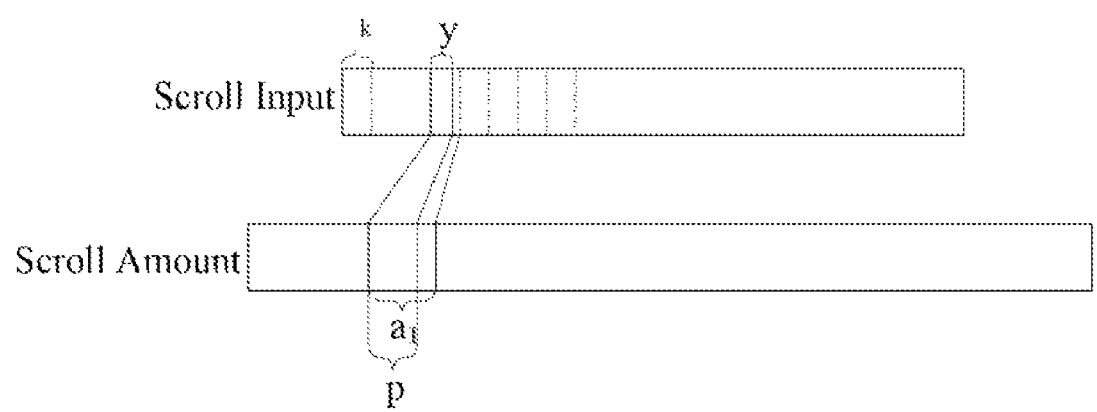
FIG. 5 is a schematic diagram illustrating a second exemplary relationship between a scroll input "y" of a scroll bar and a scroll amount "p", which relationship governs movement of content of a document shown on a display unit of the system of FIG. 2 when the method of FIG. 3 is performed.

FIG. 3 is a flowchart of a first preferred content scrolling method, which is performed by utilizing the system of FIG. 2. In step S31, the scroll bar 12 is actuated with the scroll operation being either forward or backward. In step S32, the scroll input calculating module 111 calculates the scroll input "y" of the scroll bar 12 of the scroll operation. In step S33, the scroll amount calculating module 112 calculates m and x according to the floor function floor(y/k) and the mod function mod(y/k) respectively. In step S34, the scroll amount calculating module 112 iteratively calculates $a_i$ according to the corresponding function described in formula 1 above, wherein i is in the range from 0 to m. In step S35, the scroll amount calculating module 112 calculates the scroll amount p according to formula 1 above.

In step S36, the content scrolling module 122 determines a direction of the scroll operation. If the direction is forward, in step S41, the content scrolling module 112 moves the displayed content forward according to the scroll amount p. If the direction is backward, in step S42, the content scrolling module 112 moves the displayed content backward according to the scroll amount p.

Figure 6:
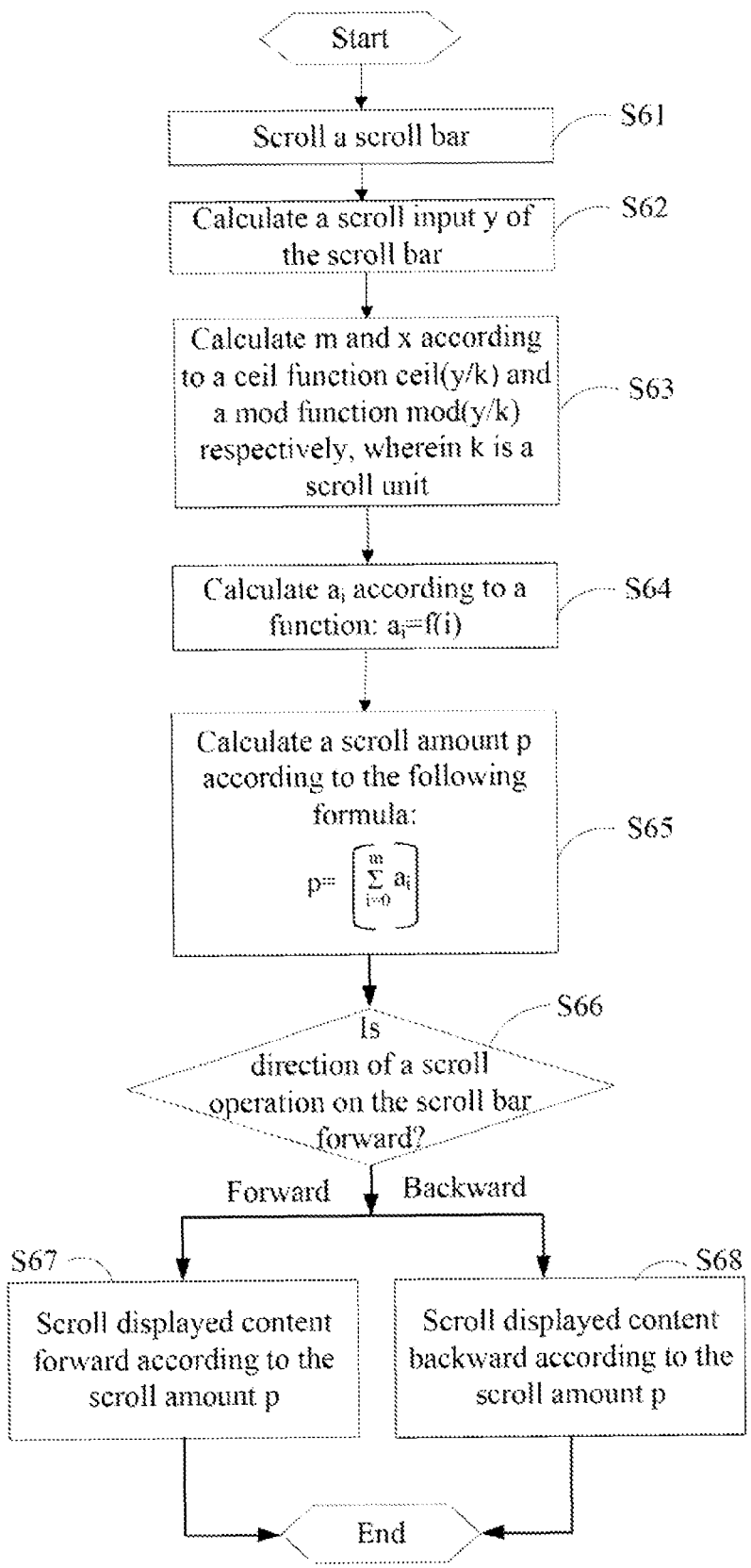
FIG. 6 is a flowchart of a second preferred content scrolling method, which is performed by utilizing the system of FIG. 2.
Figure 7:
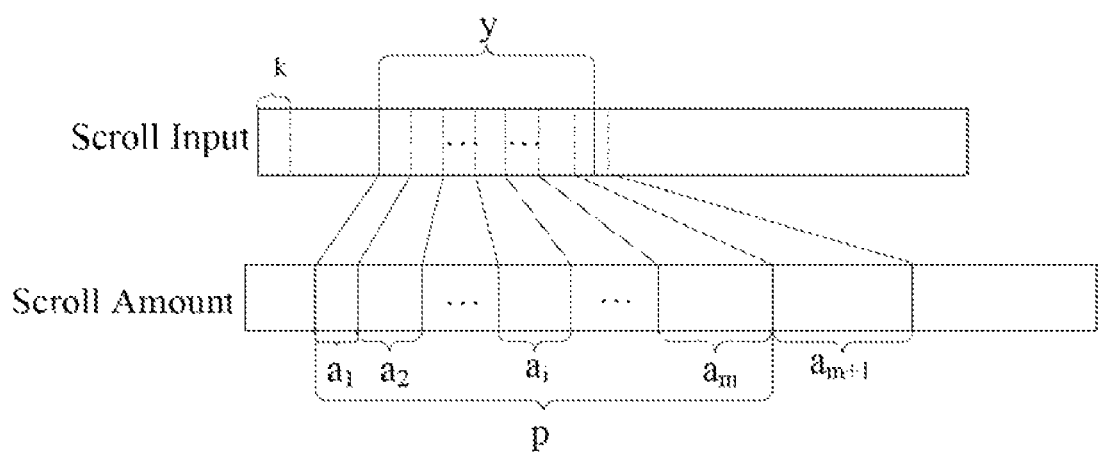
FIG. 7 is a schematic diagram illustrating an exemplary relationship between a scroll input "y" of a scroll bar and a scroll amount "p", which relationship governs movement of content of a document shown on a display unit of the system of FIG. 2 when the method of FIG. 6 is performed.

FIG. 6 is a flowchart of a second preferred content scrolling method, which is performed by utilizing the system of FIG. 2. In step S61, the scroll bar 12 is actuated with the scroll operation being either forward or backward. In step S62, the scroll input calculating module 121 calculates the scroll input "y" of the scroll bar 12 of the scroll operation. In step S63, the scroll amount calculating module 112 calculates m according to the ceil function ceil(y/k). In step S64, the scroll amount calculating module 112 iteratively calculates $a_i$ according to the corresponding function described in formula 1 above, wherein i is in the range from 0 to m. In step S65, the scroll amount calculating module 112 calculates the scroll amount p according to formula 2 above.

In step S66, the content scrolling module 113 determines the direction of the scroll operation. If the direction is forward, in step S67, the content scrolling module 112 moves the displayed content forward according to the scroll amount p. If the direction is backward, in step S68, the content scrolling module 112 moves the displayed content backward according to the scroll amount p.

Although the present invention has been specifically described on the basis of preferred embodiments including preferred methods, the invention is not to be construed as being limited thereto. Various changes or modifications may be made to the embodiments including the methods without departing from the scope and spirit of the invention.

The invention claimed is:

1. A content scrolling system comprising:
   a display unit configured for displaying content of an electronic document;
   a scroll bar configured for receiving a user instruction to scroll the displayed content; and
   a processing unit comprising:
      a scroll input calculating module configured for calculating a scroll input "y" of the scroll bar;
      a scroll amount calculating module configured for calculating a scroll amount "p" mapping to the scroll input "y" according to the formu $$p = \left(\sum_{i=0}^{m} a_i\right),$$

wherein K is a scroll input unit, m is derived from the ceil function ceil(y/k), ai is derived from the function as follows and is directly proportional to the scroll input unit k:

$$a_i = f(i) = \begin{cases} 0 & \text{if } i = 0 \\ g(i) & \text{if } i \neq 0, \text{ wherein } g(i) \text{ is an increasing function} \end{cases}$$

and i is an integer that is less than or equal to m; and
   a content scrolling module configured for scrolling the displayed content according to the scroll amount "p".

2. The content scrolling system according to claim 1, wherein the increasing function is selected from the group consisting of an arithmetic progression increasing function and a geometric progression increasing function.

3. A content scrolling system comprising:
   a display unit configured for displaying content of an electronic document;
   a scroll bar configured for receiving a user instruction to scroll the displayed content; and
   a processing unit comprising:
      a scroll input calculating module configured for calculating a scroll input "y" of the scroll bar;
      a scroll amount calculating module configured for calculating a scroll amount "p" mapping to the scroll input "y" according to a formula selected from the group consisting of the formula:

$$p = \left[\sum_{i=0}^{m} a_i\right] + [\text{ceil}(x/k * a_{m+1})],$$

and the formula:

$$p = \left(\sum_{i=0}^{m} a_i\right) - (\text{floor}(x/k * a_{m+1})),$$

wherein K is a scroll input unit, m is derived from the floor function floor(y/k), x is derived from the mod function mod(y/k), ai is derived from the function as follows and is directly proportional to the scroll input unit k:

$$a_i = f(i) = \begin{cases} 0 & \text{if } i = 0 \\ g(i) & \text{if } i \neq 0, \end{cases} \text{ wherein } g(i) \text{ is an increasing function;}$$

and i is an integer that is less than or equal to m; and a content scrolling module configured for scrolling the displayed content according to the scroll amount "p".

4. The content scrolling system according to claim 3, wherein the increasing function is selected from the group consisting of an arithmetic progression increasing function and a geometric progression increasing function.

5. A content scrolling method for controlling scrolling of displayed content of an electronic document based on a content scrolling system, the method comprising:

displaying content of an electronic document on a display unit of the content scrolling system;

providing a scroll bar to receive a user instruction of scrolling the displayed content;

defining a scroll length "k" as a scroll input unit;

calculating a scroll input "y" of the scroll bar;

calculating a scroll amount "p" mapping to the scroll input "y" of the scroll bar according to of a formula selected from the group consisting of the formula and generating a scrolling instruction of scroll amount "p":

$$p = \left[\sum_{i=0}^{m} a_i\right] + [\text{ceil}(x/k * a_{m+1})],$$

and the formula:

$$p = \left[\sum_{i=0}^{m} a_i\right] + [\text{floor}(x/k * a_{m+1})],$$

wherein k is a scroll input unit, m is derived from the floor function floor(y/k), x is derived from the mod function mod(y/k), ai is derived from the function as follows and is directly proportional to the scroll input unit k:

$$a_i = f(i) = \begin{cases} 0 & \text{if } i = 0 \\ g(i) & \text{if } i \neq 0, \end{cases} \text{ wherein } g(i) \text{ is an increasing function;}$$

and i is an integer that is less than or equal to m; and scrolling the displayed content on the display unit according to the scroll amount "p".

6. The content scrolling method according to claim 5, wherein scrolling of the displayed content on the display unit comprises:

scrolling the displayed content forward on the display unit according to the scroll amount "p" if a direction of the scroll operation on the scroll bar is forward; and scrolling the displayed content backward on the display unit according to the scroll amount "p" if a direction of the scroll operation on the scroll bar is backward.

7. The content scrolling method according to claim 5, wherein the increasing function is selected from the group consisting of an arithmetic progression increasing function and a geometric progression increasing function.

\* \* \* \* \*